(12) United States Patent
Koul et al.

(10) Patent No.: US 8,761,364 B2
(45) Date of Patent: Jun. 24, 2014

(54) TECHNIQUES FOR CONTROLLING ACCESS TO TELECONFERENCES

(75) Inventors: Rohit Koul, Jammu and Kashmir (IN); Gurudutta Ramanathaiah, Bangalore (IN); Deepak Ramakrishnan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 440 days.

(21) Appl. No.: 12/536,406

(22) Filed: Aug. 5, 2009

(65) Prior Publication Data

US 2011/0033033 A1 Feb. 10, 2011

(51) Int. Cl.
*H04M 3/42* (2006.01)

(52) U.S. Cl.
USPC ..................... 379/202.01; 379/158

(58) Field of Classification Search
USPC ................. 379/202.01, 158, 207.11
See application file for complete search history.

(56) References Cited

U.S. PATENT DOCUMENTS

| | | | |
|---|---|---|---|
| 5,369,705 A | 11/1994 | Bird et al. | |
| 6,870,916 B2* | 3/2005 | Henrikson et al. | 379/202.01 |
| 7,085,243 B2* | 8/2006 | Decker et al. | 370/261 |
| 7,215,647 B2 | 5/2007 | Wilson | |
| RE40,135 E | 3/2008 | Walsh et al. | |
| 7,460,493 B1 | 12/2008 | Dhanoa et al. | |
| 7,477,282 B2 | 1/2009 | Firestone et al. | |
| 7,590,230 B1* | 9/2009 | Surazski | 379/202.01 |
| 8,437,461 B1* | 5/2013 | Gartner et al. | 379/202.01 |
| 2002/0136383 A1* | 9/2002 | Contreras | 379/211.01 |
| 2004/0032485 A1* | 2/2004 | Stephens, Jr. | 348/14.08 |
| 2004/0199580 A1 | 10/2004 | Zhakov et al. | |
| 2004/0235509 A1* | 11/2004 | Burritt et al. | 455/519 |
| 2006/0101143 A1* | 5/2006 | Garcia et al. | 709/225 |
| 2007/0047715 A1* | 3/2007 | Madhusudan et al. | 379/202.01 |
| 2007/0081647 A1* | 4/2007 | Baker | 379/158 |
| 2008/0069328 A1* | 3/2008 | Bostick et al. | 379/202.01 |
| 2008/0209330 A1 | 8/2008 | Cruver | |
| 2009/0123035 A1* | 5/2009 | Khouri et al. | 382/115 |
| 2010/0061539 A1* | 3/2010 | Cloran et al. | 379/202.01 |
| 2010/0189242 A1* | 7/2010 | Jenkins et al. | 379/202.01 |
| 2010/0189243 A1* | 7/2010 | Miller et al. | 379/202.01 |
| 2012/0063573 A1* | 3/2012 | Sylvain | 379/67.1 |

OTHER PUBLICATIONS

"FAQ: Get all the answers about 800 conference calling and tele conferencing—Global con . . . ," [online], [retrieved on Jan. 22, 2009]. Retrieved from the internet <URL http://www.globalconference.com/FAQ.aspx>.

"FAQs—Audio: Unlimited Conferencing—Frequently asked questions regarding Unlimited Audio Conferencing service:," [online], [retrieved on Jan. 22, 2009]. Retrieved from the internet <URL http://www.unlimitedconferencing.com/customer_center/faqs_audio.htm>.

(Continued)

*Primary Examiner* — William Deane, Jr.
(74) *Attorney, Agent, or Firm* — Kilpatrick Townsend & Stockton, LLP

(57) ABSTRACT

Techniques for managing teleconferences. A plurality of people are associated with a plurality of identifiers such that each person is associated with at least one identifier. For each caller to a teleconference associated with a different identifier, authentication information is solicited from the caller. Authentication information is received from the caller in response to the solicitation and a determination, based on the received authentication information, is made whether the caller is associated with one of the identifiers.

25 Claims, 5 Drawing Sheets

(56) References Cited

OTHER PUBLICATIONS

"Instant Conference—How Free Conferencing Works,"[online], [retrieved on Jan. 22, 2009]. Retrieved from the internet <URL http://www.instantconference.com/how-free-conferencing-works.aspx>.

Fact Sheet—GoToMeeting: Online Meetings Made Easy (product information) [online], [retrieved on Jan. 22, 2009]. Retrieved from the internet <URL http://www2.gotomeeting.com/default/downloads/pdf/p/GoToMeeting_Fact_Sheet.pdf>.

* cited by examiner

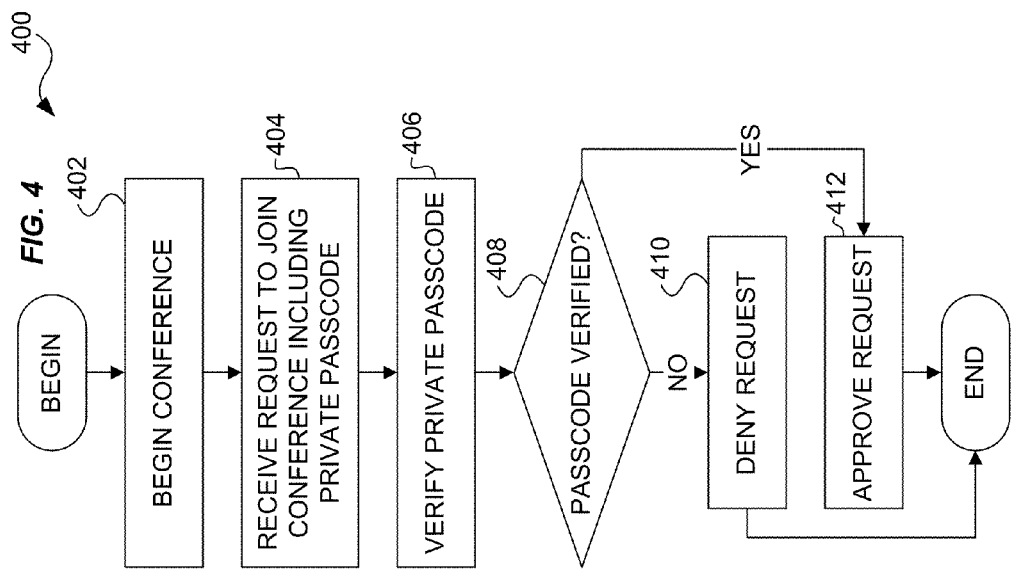
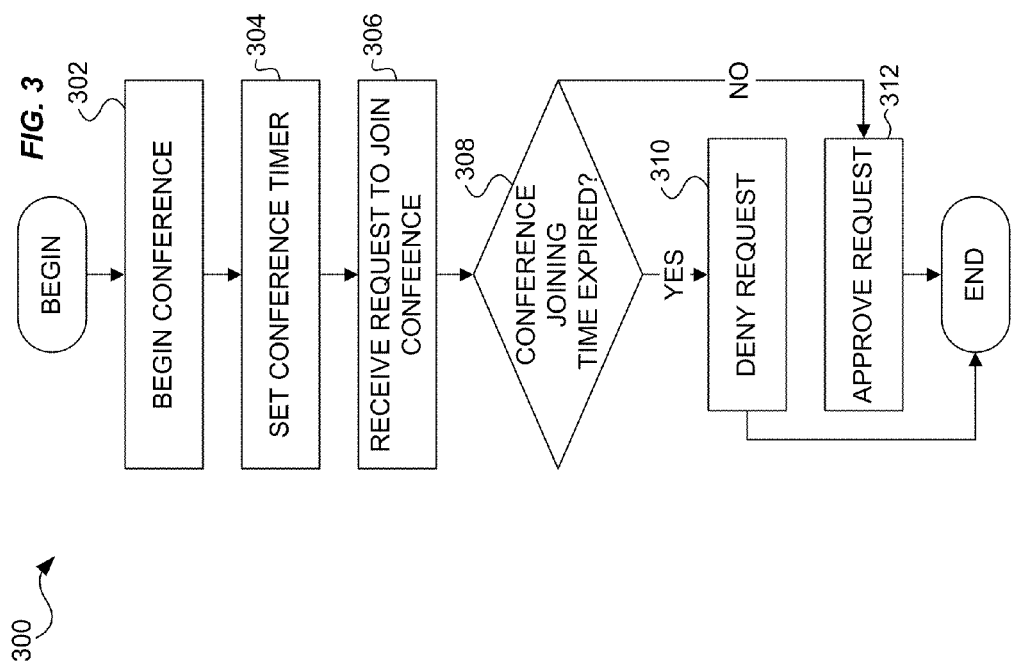

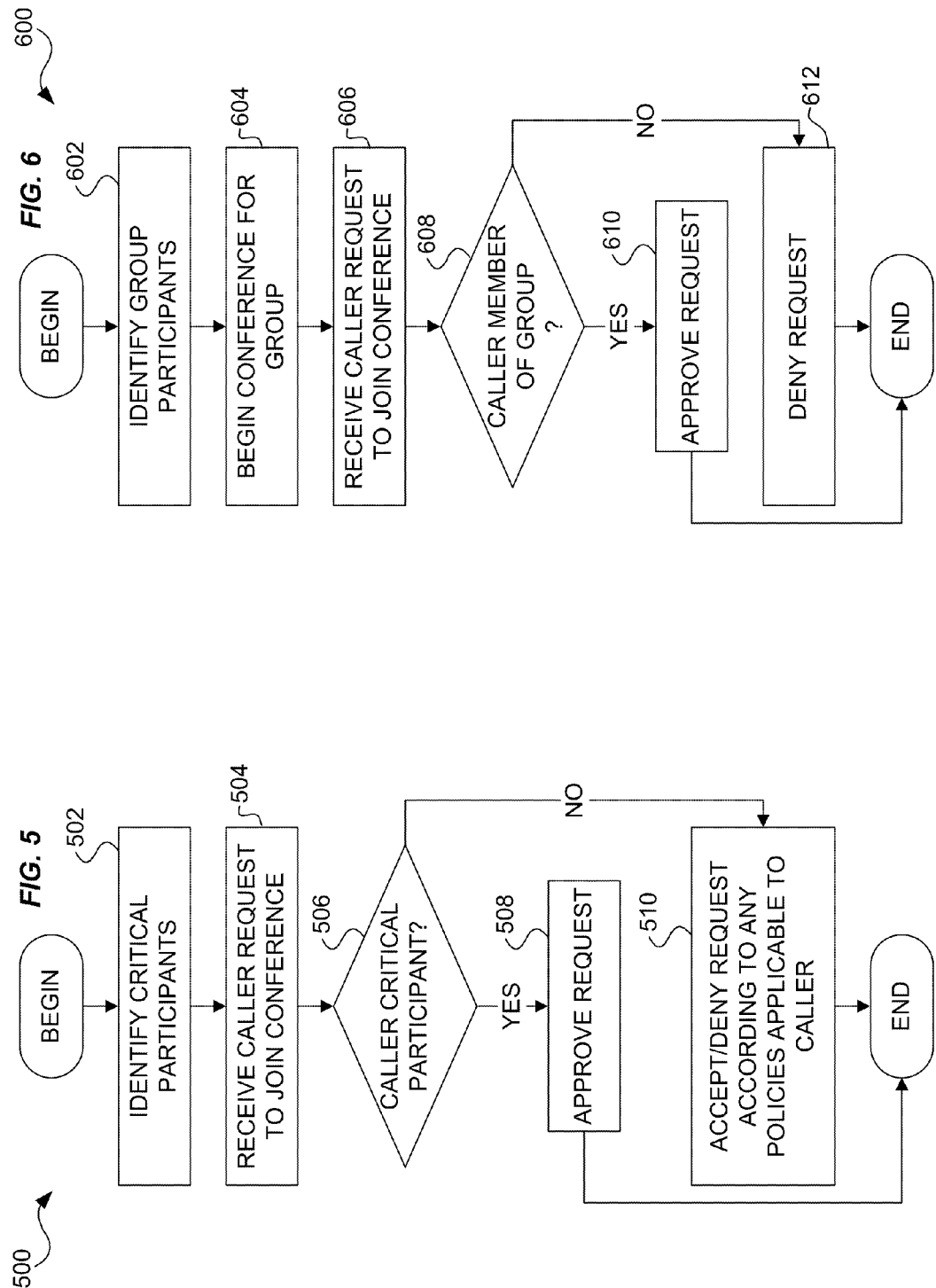

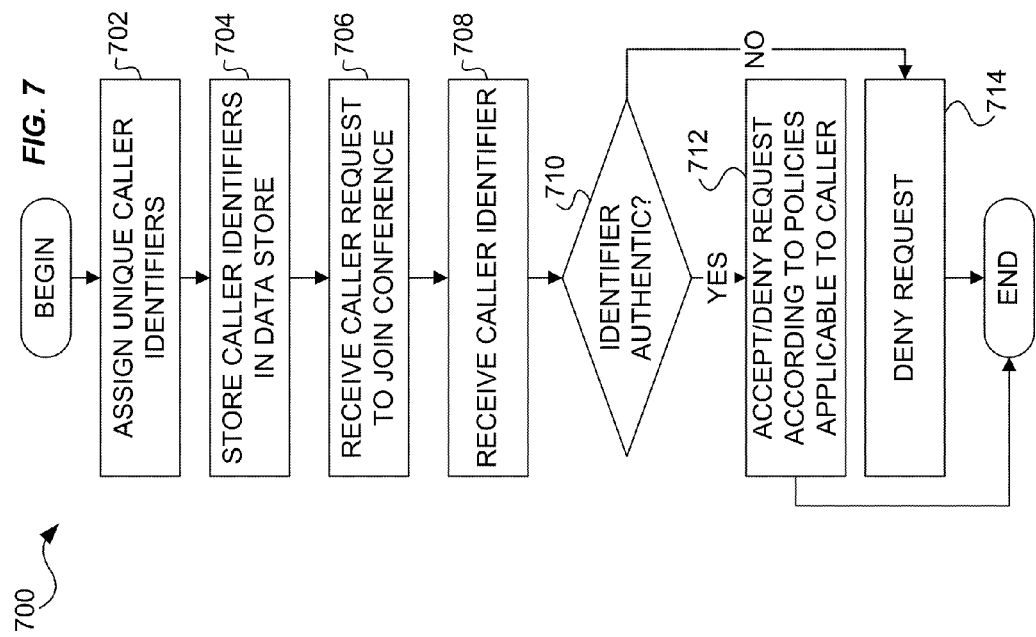

US 8,761,364 B2

TECHNIQUES FOR CONTROLLING ACCESS TO TELECONFERENCES

BACKGROUND OF THE INVENTION

Teleconferencing is a convenient way to allow people in various geographic locations to discuss various matters. Teleconferencing has numerous advantages because it allows for the sharing of ideas and information without the time, expense, and effort required with physical travel, which can be quite substantial if a meeting includes numerous participants from various parts of the world. Typically, teleconferences are arranged by providing a group of people with a telephone number for the conference and perhaps a pass code that they can use to enter the conference, where the number and pass code are the same for all participants. When conferences are initiated in this manner, it is easy for anybody who has the number and passcode to join the conference and listen to the conversation. In certain situations, this may not be desirable, for example, when confidential or otherwise sensitive information is being discussed. Moreover, users joining in and out at different times and at will sometimes cause disturbance to the channel and breaks the flow of the ongoing conversation.

In other situations, teleconferences are not productive if certain people are not in attendance. For example, a teleconference may be useless if a manager of the attendees is not present. As another example, if a board of directors of an organization is meeting via teleconference, it may be unproductive to hold a teleconference if a quorum, as defined by the bylaws of the organization, is not present. As yet another example, a meeting among different departments of an organization may require a representative from each department. In these and other situations, it is often more productive to reschedule the teleconference than attempt to hold the teleconference without key attendees.

Moreover, verification of whether key members are in attendance can be quite cumbersome. For instance, different attendees may have different ideas of who is regarded as a key attendee and, therefore, the time of many individuals may be wasted during discussions over whether the teleconference should proceed. Also, simply verifying who is in attendance often requires someone to ask, via the conference, who is in attendance or input a certain key combination in order to hear a list of attendees, the audio for which is generated by a user saying his or her name. Not only is this cumbersome, often one or more people will join a teleconference and then attend to other matters, such as stepping out of the room to go to the restroom, until the meeting begins. In addition, systems that provide a list of attendees using an audio recording of a name given by an attendee does not adequately protect against attendees providing fake names. In this case, it can be difficult to actually verify whether that person has joined the teleconference.

BRIEF SUMMARY OF THE INVENTION

Techniques for controlling access to teleconferences are disclosed herein. In an embodiment, a method of managing a conference is disclosed. A conference is initiated by communicatively connecting together a set of people, such as over a telephone or other network. A timer is set and a request to join the conference from a user is received. The request is approved or denied based on the state of the timer.

Each of a plurality of people may be associated with one of a plurality of passcodes. A passcode from a user may be received, for example, in connection with a request to join the conference or in connection with an identify authentication process incorporated into a conferencing system. The passcode received from the user is verified against the plurality of passcodes and a specified action in connection with the conference may be taken based on the verification. For instance, one or more of the plurality of passcodes may be associated with a critical participant of the conference or an authentication system may provide a user's identity from which a determination whether the user is a critical participant may be made. If a request to join the conference is received from a user who provides a passcode, the passcode or identity of the user may be determined to be associated with a critical participant and the user may be allowed to join the conference regardless of the state of the timer. In accordance with an embodiment, critical passcodes are randomly or otherwise generated for every meeting/conference and sent to the actual critical participants via a separate channel, such as electronic mail. Such a passcode may be used to join a conference as a critical participant and the passcode would be valid for the duration of the meeting or conference.

In an embodiment, people are associated with groups. A teleconference may be identified with a group such that, when a request to join the conference is received from a user, a determination whether the user is a member of the group may be made. The request may be made based on the determination. Generally, parameters for a conference to be able to proceed may be defined. A determination whether the parameters are fulfilled may be made and a group of people may be connected as a result of the parameters being fulfilled.

In accordance with another embodiment, a computer-readable medium having stored thereon instructions for causing a computer system to perform a method of managing a conference is disclosed. The instructions cause the computer system to communicatively connect together a set of people to initiate the conference, set a timer, receive a request to join the conference from a user, and approve the request based on the state of the timer.

The instructions may also cause the computer system to associate, for the conference, each of a plurality of passcodes with one of a plurality of people, to receive a passcode from the user, and verify the passcode against the plurality of passcodes. A specified action may be taken based on the verification. The instructions may also cause the computer system to identify one of said plurality of passcodes as associated with a critical participant, receive a second request to join the conference that includes one of the passcodes from said second user, and approve the second request regardless of the state of the timer.

The computer-readable medium may also include other instructions as well. For example, included may be instructions that cause the computer system to associate each of a plurality of people with one or more groups, said set of people being members of one of said groups, to receive a second request to join the conference from a second user, to make a determination whether said second user is a member of said one of said groups, and to approve said second request based on said determination. As another example, the instructions may cause the computer system to identify attendance parameters for which fulfillment is required for the conference to proceed and to make a determination that said attendance parameters are fulfilled. Communicatively connecting the set of people may be performed as a result of the determination.

In accordance with yet another embodiment, a method for managing a teleconference is disclosed. The method includes associating a plurality of people with a plurality of identifiers where each person of said people is associated with at least one identifier. For each caller to the teleconference that is associated with a different identifier, authentication information is solicited from the caller, and authentication information is received from the caller in response to the solicitation. Further, based on the authentication information, a determination whether the caller is associated with one of the identifiers is received and a specified action is taken based on the determination. The specified action may include connecting the caller to the teleconference.

The method may also include identifying a set of said plurality of people as critical participants for the teleconference. A second determination whether the caller is identified as a critical participant for the teleconference may be made and the specified action may be made based on the second determination. Subsets of people may be identified and one of the subsets may be assigned to the teleconference. A determination whether the caller is a member of the subset assigned to the teleconference may be made and, depending on the determination, the specified action may be based on the determination and include connecting the caller to the teleconference. Generally, attendance parameters for the teleconference to proceed may be identified and the specified action may include making a second determination whether the attendance parameters are fulfilled and initiating the teleconference based on the second determination.

In accordance with another embodiment, a computer-readable medium having stored thereon instructions for causing a computer system to perform a method for managing a teleconference is disclosed in accordance with an embodiment. The instructions cause the computer system to associate a plurality of people with a plurality of identifiers, each person of said people associated with at least one identifier of said identifiers. For each of a plurality of callers that is associated with a different identifier, the instructions cause the computer system to provide a solicitation to the caller for authentication information, receive from the caller said authentication information in response to said solicitation, make a first determination based on said authentication information whether said caller is associated with an identifier of said identifiers, and take a specified action for the teleconference based on said first determination. The specified action may be to communicatively connect the caller to the teleconference.

The instructions may also cause the computer system to perform additional actions, such as to identify a set of said plurality of people as critical participants for the teleconference, and to make a second determination whether said caller is identified as a critical participant for the teleconference. The specified action may be further based on the second determination. Also, the instructions may cause the computer system to identify subsets of said plurality of people, to assign a first subset of said subsets to the teleconference, and to make a second determination whether said caller is a member of said first subset. The specified action may be further based on the second determination and may include communicatively connecting the caller to the teleconference. As yet another example, the instructions may cause the computer system to identify attendance parameters for which fulfillment is required for the teleconference to proceed. The instructions for performing the specified action may include instructions for causing the computer system to make a second determination whether attendance parameters are fulfilled and to initiate said teleconference based on said second determination.

In accordance with yet another embodiment, a system for managing teleconferences is provided. The system includes a data store and a server. The data store is operable to store a plurality of identifiers, each identifier associated with at least one person. The server is communicatively coupled to the data store and operable to perform actions for each caller of a plurality of callers to the teleconference that are associated with different identifiers of said identifiers. The actions include providing a solicitation to the caller for authentication information, receiving from the caller said authentication information in response to said solicitation, making a first determination based on said authentication information whether said caller is associated with an identifier of said identifiers, and taking a specified action for the teleconference based on said first determination. The specified action may include communicatively connecting the caller to the teleconference.

The system may also include other features. For instance, the server may be further operable to identify a set of said plurality of people as critical participants for the teleconference and make a second determination whether said caller is identified as a critical participant for the teleconference. The specified action may be further based on said second determination. As another example, the server may be further operable to identify subsets of said plurality of people, assign a first subset of said subsets to the teleconference, and make a second determination whether said caller is a member of said first subset. The specified action may be further based on said second determination and include communicatively connecting the caller to the teleconference. The data store may be further operable to store attendance parameters for which fulfillment is required for the teleconference to proceed and the server may be further operable to make a second determination whether attendance parameters are fulfilled in order to initiate said teleconference based on said second determination.

BRIEF DESCRIPTION OF THE DRAWINGS

FIG. 3 shows a flowchart for a method for conducting a teleconference utilizing a timer in accordance with an embodiment;

FIG. 4 shows a flowchart for a method for conducting a teleconference utilizing private passcodes in accordance with an embodiment;

FIG. 5 shows a flowchart for a method for conducting a teleconference in which critical participants are identified in accordance with an embodiment;

FIG. 6 shows a flowchart of a method for conducting a teleconference in which group participants for the teleconference are identified in accordance with an embodiment;

FIG. 7 shows a flowchart for a method for conducting a teleconference in which user identifies are authenticated in accordance with an embodiment; and FIG. 8 shows a flowchart for a method in which quorum parameters are utilized in accordance with an embodiment.

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

The following description describes an embodiment of the present invention in the teleconferencing domain. However, the scope of the present invention is not restricted to teleconferencing, but may be applied to other domains or applications. For example, any domain or application where collaborative communication over a communications network among a plurality of people may make use of the present invention. Examples of domains in which embodiments of the present invention may be used include conferencing in general using text, audio, video, and other tools.

In general, embodiments of the present invention provide techniques for managing teleconferences. In an embodiment, callers to a conference communicatively connect to a teleconferencing system, such as a VOIP call server or other device capable of managing conferences. The callers are authenticated by providing authentication information. As described in more detail below, the level of participation in a teleconference is based on whether a user is authenticated, any policies applicable to the user, which may be determined through authentication, and/or whether a timer for the teleconference has expired.

Figure 1:
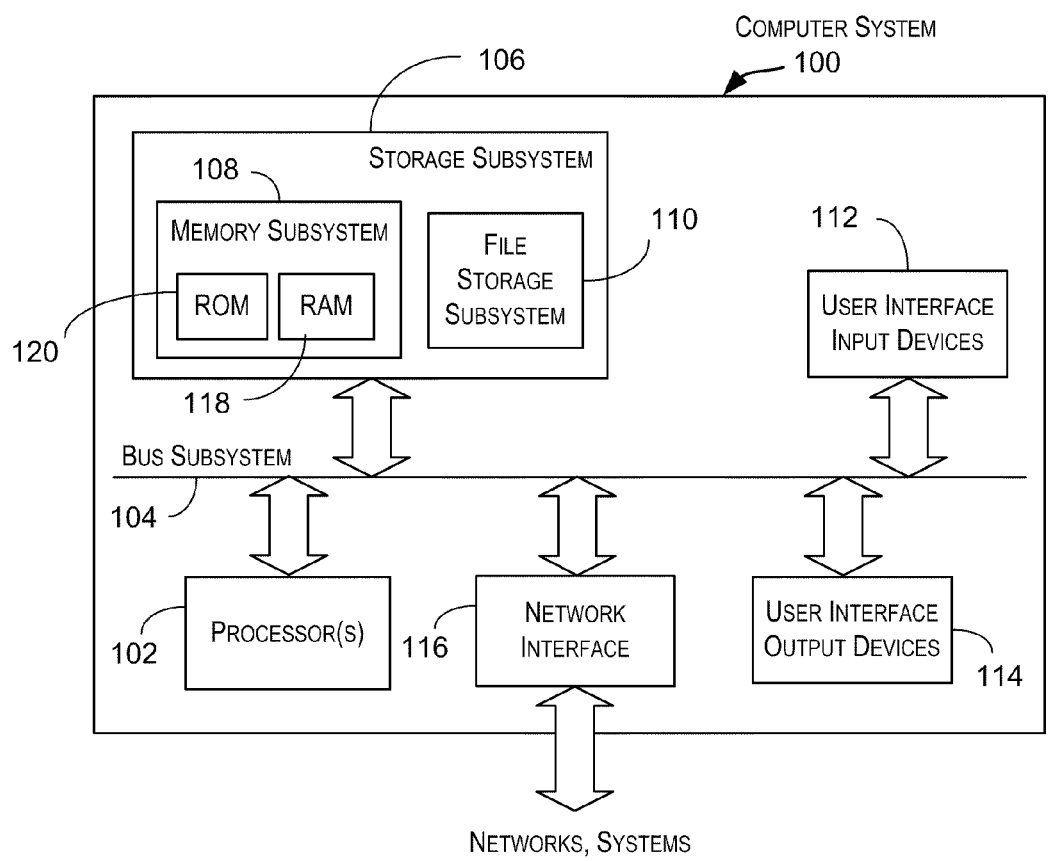
FIG. 1 shows a simplified block diagram of a computer system that may be used to practice an embodiment of the present invention.

Turning now to the drawings, FIG. 1 is a simplified block diagram of a computer system 100 that may be used to practice an embodiment of the present invention. Computer system 100 may serve as a processing system or a client system for a conferencing system operable to manage teleconferences in accordance with various embodiments described herein. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to organize teleconferences in accordance with various embodiments described herein.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Various text and/or graphics associated with management of telephone conferences may be output via the output devices 114. For example, the output device 114 may provide a list of participants of a pending teleconference.

Storage subsystem 106 provides a computer-readable medium for storing the basic programming and data constructs that provide the functionality of the present invention. Software (programs, code modules, instructions) that when executed by a processor provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for instructions and data of a conferencing system operable to manage teleconferences. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 100 can be of various types including a personal computer, a portable computer, a workstation, a network computer, a mainframe, a kiosk, a voice over internet protocol (VOIP) telephone or call server, another server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
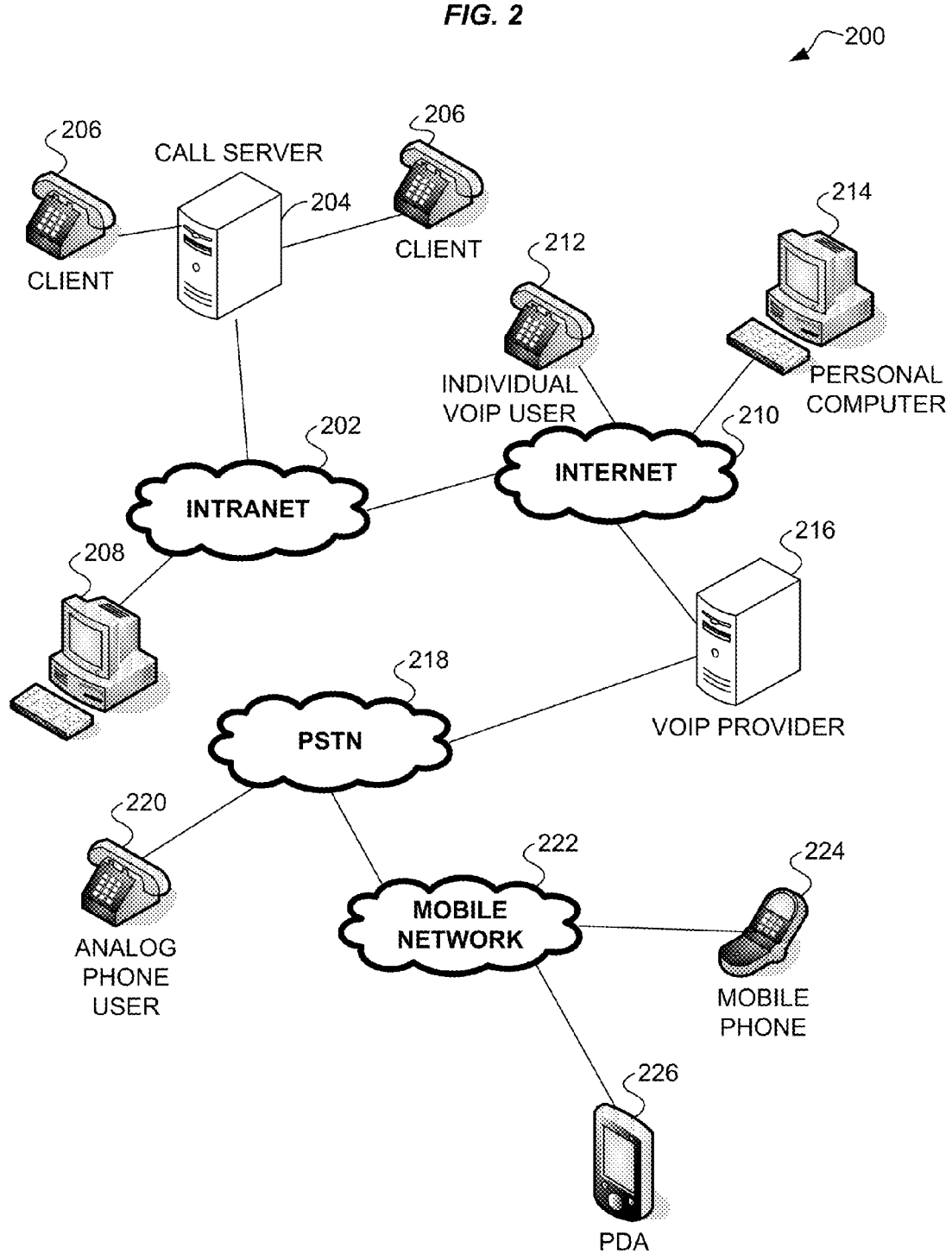
FIG. 2 illustrates an example of a network environment in which an embodiment of an invention may be practiced.

FIG. 2 shows an environment 200 in which embodiments of the present invention may be practiced. For example, in an embodiment, the environment includes an intranet 202 of an organization to which various computers and telephones may be communicably connected. For example, a call server 204, for providing telephone capabilities to various people in the organization, may be connected to the intranet 202. Various client devices 206, such as a plurality of telephones of an organization, may be communicably connected to the call server which is operable to direct calls to, from, and within the organization and to communicatively connect a plurality of callers, whether internal or external to the organization, in a single conference call. Also personal computers used by those within the organization may also be connected to the intranet 202 in order to access the organization's network systems such as application servers, data servers, web servers, and other devices.

Typically, an organization's intranet is also connected to a communications network such as the Internet 210. As is known, various devices of many people are also connected to the Internet 210. For instance, voice over internet protocol (VOIP) users 212 may be connected to the Internet through a VOIP-enabled telephone through an Internet service provider in order to make telephone calls. Also, as is known, any personal computers 214 are also connected to the Internet 210 for a wide variety of purposes, such as accessing data, purchasing products and/or services, interfacing with applications on a remote application server, making voice or video calls through the personal computers, and the like.

Calls initiated from an organization or from individuals may be routed through the Internet to a VOIP provider 216, in accordance with an embodiment. For example, the call server 204 may direct calls from a client 206 to a party outside of the organization to the VOIP provider 216 via the Internet 210.

Typically, calls initiated in this manner are digitally encoded by the client 206 device and the VOIP provider 216 then translates the digital call information into analog call information and routes the call through a public switched telephone network (PSTN) 218. However, calls may also remain digital without being translated to analog, such as in cases where the party receiving the call is using a device able to receive the digital calls. As is known, the plurality of analog phone users 220 are also connected to the PSTN 218. A mobile network 222 may be communicably connected to the PSTN 218 such that calls from mobile phones 224 may be routed to other people and calls and/or data from personal digital assistants (PDA) 226 may also be routed.

While the environment 200 shows basic components of an illustrative environment in which embodiments of the present invention may be practiced, devices known in the art have been omitted from the drawings for the purpose of clarity. In addition, while the drawing shows various devices connected together in a network, a typical teleconference will connect only a subset of the devices shown. Also, it should be noted that the diagram of FIG. 2 is for the purposes of illustration and that other devices, other than those shown, may also be used and that devices shown may be omitted, as appropriate.

FIG. 3 shows a time-based conference access method 300 in accordance with an embodiment. Generally, the time-based conference access method 300 is a method for controlling access to a teleconference based on a timer such that, once the timer has expired, access to the teleconference is no longer allowed or otherwise restricted. The method depicted in FIG. 3 (and any other methods described herein, or variations thereof) may be implemented by software (e.g., code, instructions, program) executing on a processor, by hardware, or combinations thereof. The software may be stored on a computer-readable storage medium, for example, in the form of a computer program comprising a plurality of instructions executable by one or more processors.

In an embodiment, a conference is initiated at a conference initiation step 302. In an embodiment, initiating a conference includes connecting a group of two or more callers together such that they can converse or otherwise communicate with each other. As known by those in the art, connecting callers together may include facilitating communication among devices (e.g., telephones, personal computers, and the like) used by the callers such that the devices send and receive signals among each other, where the signals are generated as a result of the callers' interaction with the devices, such as speaking to and/or manipulating a graphical interface of the device.

Initiating a conference may alternatively include connecting one or more callers to a device operable to manage the conference, such as a call server that, for example, for each device in the conference, receives from the device a signal representative of sounds made by a caller and sends the signal to the remaining devices. Initiating a conference can be directed by a person identified as an organizer of a conference who indicates that a conference has begun, for example, by selecting elements of an interface of the call server. Initiating the conference can also be done in other ways, for example, by beginning a conference whenever the first caller attempting to join the conference attempts to do so or, for example, by beginning a conference by opening (allowing) connections to a device operable to manage the conference at a predetermined time which may be set beforehand by an organizer of the conference.

At a timer setting step 304, a timer is set to allow a specified amount of time for conference participants to join. For example, a timer may be set automatically to a predetermined time, such as fifteen minutes, from the time the conference is determined to be initiated. Also, a person identified as an organizer of the conference may manually set the timer either to a predetermined amount of time or to a selected amount when he or she decides, such as when the organizer determines that a substantive portion of the teleconference has begun. As another alternative, a conference timer may be initiated when it is determined that a set of conditions for the conference (such as a quorum, or other conditions, discussed below) have been met. When setting up the conference, an organizer of the conference may choose how much time he or she would like to allow for others to join the conference.

Once the timer is set, in an embodiment, a request to join the conference is received at a request receiving step 306. For example, as is known, a person wishing to participate in the conference may dial a telephone number of the conference and may provide other information such as a passcode for the conference or other authenticating information, such as that described below. Once a request to join the conference is received, a determination is made whether or not the time of the timer has expired at an expiration checking step 308. In an embodiment, checking whether the conference time has expired involves determining whether the amount of time since the timer has been set has exceeded a specified amount. In accordance with an embodiment, if it is determined that the time to join the conference has expired, the request to join the conference is denied at a request denial step 310.

It should be understood that other actions may be taken as an alternative or in addition to denying the request to join the conference. For example, a person having submitted the request to join the conference may be allowed to listen to the conference, but not act as a participant in the conference. In this manner, it can be ensured that late arriving participants do not impede the progress of the conference by, for example, asking questions that already have been answered, while allowing the late arriving participants to receive information by listening to the conference. In an alternate embodiment, a message is sent either audibly or visibly, such as on a computer screen or screen of a device used by an organizer to participate in the conference, to the organizer who may, at his or her discretion, allow the participant to join the conference after the time has expired by, for example, selecting an "allow" or "deny" element of an interface used in connection with the telephone conference.

If the conference time has not expired, however, in an embodiment, the request to join the conference is approved at a request approval step 312 in accordance with an embodiment. Generally, as the conference proceeds, other requests to join the conference are handled as described above.

Additional variations of the time-based conference access method 300 are also possible. For example, if a telephone conference is conducted in connection with an authentication system, such as that described below, different actions may be taken for different classes of users. As an example, certain individuals may be identified and allowed to join a conference regardless of whether the timer has expired while all other users may be allowed to join a conference before expiration of the timer. Generally, different users may have different levels of access to the conference after a timer for the conference has expired. In addition, more than one timer may be employed so that, for example, one timer applies to certain individuals while another timer applies to other individuals. As another example, individuals may be allowed to listen but not participate in a conference after expiration of a first timer while no access to the conference may be allowed after expiration of a second timer. Of course, combinations and variations of the above examples are also possible.

FIG. 4 shows a passcode verification method 400 for conducting the conference in accordance with an embodiment. Generally, the passcode verification method 400 verifies passcodes of callers to a conference in order to allow the callers into the conference. The passcode, for instance, may be a code that is uniquely assigned to each person invited to the conference. A passcode for each call may be generated for each conference and may be communicated to each invitee to the conference. Alternatively, passcodes may be permanently assigned to each person having an account with a conferencing system, which may associate passcodes with more user-friendly information, such as email addresses, first and last names, and the like in order to enable user-friendly application of policies to specific people. Users having permanent passcodes may use those passcodes while ad hoc passcodes may be generated for callers that do not have an account with the conferencing system, such as callers from outside of an organization utilizing a conferencing system to organize the conference. For passcodes that are not chosen by the callers themselves when registering with a conferencing system, the passcodes may be communicated to callers though various ways, such as through electronic mail.

At a conference initiation step 402, a conference is initiated. For example, the conference initiation step 402 may be similar to that described above. At a passcode receipt step 404, a request to join a conference, including a private passcode, is received, in accordance with an embodiment. For example, a caller may call a telephone number for the conference and then may be prompted to provide a private passcode which he or she may dial into a keypad of a telephone or other input device, such as a keypad or keyboard of a personal or laptop computer. Once the passcode is received, it is verified at a passcode verification step 406. For example, verifying the passcode may include comparing the passcode received from a caller with passcodes stored in a data store or, for example, a record in a data store corresponding to the specific conference that includes a list of passcodes corresponding to people allowed to participate in the conference. At a verification decision step 408 a determination based on whether the passcode is verified is made.

If the passcode is not verified, in an embodiment, the request to join the conference is denied at a request denial step 410, which may be similar to the request denial step described above in connection with FIG. 3. If the passcode is verified, the request to join the conference is approved at a request approval step 412, and the caller, having provided the passcode, is allowed to join the conference.

Variations of the passcode verification method are also possible. For example, actions other than allowing or denying a request to join a conference may be made based on verification to the passcode. For instance, as discussed above, different levels of access to a conference may be provided based on whether the passcode is verified. Also, passcodes may be assigned to classes of people, such as classes of employees, so that, after verification of a passcode, the amount of access to the conference is based on the class assigned to the passcode. For instance, managers may be able to speak in the conference while other employees may only be allowed to listen to the conference. As yet another example, a conferencing system may utilize passcodes to verify and log caller participation in a conference by, for instance, calculating when a caller joined and left a conference and the duration of any conference attendance. Variations and combinations of the steps above may also be performed.

FIG. 5 shows a critical participant access control method 500 in accordance with an embodiment. Generally, the critical participant access control method allows a caller to join a conference if he or she is identified as a critical participant but decides whether to allow the caller into the conference based on any policies if he or she is not identified as a critical participant. In an embodiment, a critical participant is a participant without whom the conference cannot proceed or is a person having other characteristics. For example, using the method described above in connection with FIG. 3, a critical participant may be allowed to join a conference after a timer has expired.

Returning to FIG. 5, at a critical participant identification step 502, an organizer of the conference identifies critical participants. For example, an organizer of the conference may, using an interface utilized in connection with a conferencing system, select from a list of names to which invitations to the conference have been issued to identify those people who, in the opinion of the conference organizer, are critical. Identification of critical participants may also be made at other times, such as when identifying the invitees of the conference.

At a request receipt step 504, a request to join the conference is received, such as in the manner described above. In an embodiment, once the request to join the conference is received, a determination is made whether that caller is a critical participant at a critical participant checking step 506. For example, determining whether the caller is a critical participant may be accomplished by checking a passcode provided by the caller against a data record in a data store for the conference to determine whether the provided passcode is associated with information identifying the caller as critical. In an embodiment, the caller's identity has been authenticated by an authentication system and the caller's identity is checked against a set of one or more identities identified as critical participants for the conference. The passcode itself may also identify whether a participant is critical such as, for instance, by having a digit that is set to a certain value if the passcode is associated with a critical participant or by having other properties that indicate that the passcode is associated with a critical participant. Passcodes may be randomly or otherwise generated. In addition to the foregoing, in an embodiment, passcodes may be randomized so that passcodes cannot be predicted from state information about the process by which they are generated.

If the caller having requested to join the conference has provided information indicative that the caller is a critical participant, then a determination is made that the caller is a critical participant and the request to join the conference is approved at a request approval step 508. If it is determined that the caller is not a critical participant, the request to join the conference may be accepted or denied depending on any other policies applicable to the caller at a policy application step 510. For example, if a timer, such as that described above, is in place and has expired, the caller may not be allowed to join the conference or may be allowed only limited conference access. As another example, if the conference organizer has organized the conference to only allow certain callers, and if the passcode provided by the caller does not match a passcode associated with any of the callers allowed for the conference, then the request to join the conference may be denied.

FIG. 6 shows a group conferencing method 600 in accordance with an embodiment. In an embodiment, group participants are identified at a group identification step 602. For example, if a particular set of employees holds a weekly meeting by telephone conference, those employees may be identified as participants in a group corresponding to the weekly meeting. In an embodiment, identifying group participants is performed through a user interface of a conferencing system by identifying individuals of the group. For instance, a conference organizer may provide information identifying each individual participant in the conference, such as by providing or selecting an electronic mail address or other caller-specific information of each participant. A data record identifying the group and its participants is then stored in a data store along with any other pertinent information, such as policies for allowing other callers that are not part of the group. The data record, for example, may be a table in a data base that includes a list of participants. In an embodiment, each member of the group is provided a unique passcode.

Identification of the group participants may include providing group participants a notification of the conference. In an embodiment, an electronic mail message containing notification of the conference is sent to each invitee of the conference. The notification, for instance, may include a call-in number for the meeting and may include a number generated for the meeting. The notification may also include a unique passcode generated for one or more of the group members for the conference.

At a conference initiation step 604, the conference is initiated for the group whose participants have been identified. Beginning the conference may be accomplished, for example, in the manner described above. In an embodiment, a request to join the conference is received from a caller at a request receipt step 606, such as in the manner described above in accordance with an embodiment. When the request is received, in an embodiment, a determination is made whether that caller is a member of the group for which the conference was set up at a membership checking step 608. Determining whether the caller is a member of the group may include, for example, verifying the information identifying the caller (such as a passcode) and checking a data record whether the caller is listed as a member of the group.

If it is determined that a caller is a member of the group, then his or her request to join the conference is approved at a request approval step 610, which may be accomplished in a manner similar to that described above. In an embodiment, if it is determined that a caller is not a member of the group, his or her request to join the conference is denied in accordance with an embodiment at a request denial step 612. As above, if it is determined that a caller is not a member of the group, his or her request to join the conference may be approved or denied according to any policies for the caller which may be determined by the conference organizer. For instance, the caller may be allowed to listen but not participate if he or she is not a member of the group. As another example, if the caller has provided a passcode that is indicative that he or she is a manager, supervisor, or other class of employee, he or she may be allowed to join the conference regardless of whether he or she is a member of the group.

FIG. 7 shows a participant conference authentication method 700 in accordance with an embodiment. At an ID assignment step 702, unique caller identifiers are assigned to a plurality of people. The caller identifiers may be unique to each person, or may be unique to certain groups of people, such as to certain classes of employees or to certain teams of employees. In an embodiment, each of the plurality of people is provided a different number, such as a unique passcode, corresponding to that person. Other methods may also be used, for example, by providing a user name and password or, for example, by using biometric identifiers.

ID assignment may proceed in a variety of ways. For instance, in an embodiment, a conferencing system provides accounts for each person who registers with it. Part of the registration process may be to assign a caller identifier (username) to each person, such as a string of characters, numbers, or other information unique to each person. Each person may also select or be assigned a password, which is not revealed to anyone else except, perhaps, users of the conferencing system having administrative or other special privileges. In this manner, to users of the conferencing system, callers may be identified uniquely by their username to one another, but each user may provide their password to the conferencing system so as to provide assurances that the person claiming to be associated with a particular username is actually that person.

Caller identifiers may be assigned in a variety of other ways. For instance, for a conference, an organizer of the conference may select or otherwise input electronic mail addresses (or other communicative identifier) for invitees to the conference. A caller identifier may then be associated with each electronic mail address, such as a number or string, which may be randomly or otherwise generated. The caller identifier may be temporary (assigned for one particular conference, or for a set period of time) or may be permanent (assigned for an indeterminate period of time so as to be usable for multiple conferences). For example, users of a conferencing system of an organization and other individuals who frequently utilize the conferencing system may be assigned permanent caller identifiers while temporary identifiers may be assigned to less-frequent or one-time users.

In an embodiment, the caller identifier may then be provided to each invitee, such as by providing the caller identifier in an electronic mail or other message to each invitee. Providing the caller identifier may be done for each conference, or done over time as, for instance, people register with a conferencing system.

Once the caller identifiers are assigned, they are stored at a data store at an ID storage step 704. In an embodiment, the caller identifiers are stored in a relational database in a table that associates each person to whom an identifier is assigned with the appropriate identifier or identifiers, although other ways of storing identifiers may be used. Other information may also be stored in the data store, such as password or other information that may be used for authentication.

At a request receipt step 706, a request from a caller to join a conference is received, such as in a manner described above. In addition, at an ID receipt step 708, a caller identifier may be received from the caller having made the request to join the conference. For instance, in an embodiment, the request receiving step 706 is made when a caller calls a telephone number provided for the conference and, having dialed that number, the caller may be prompted to input his or her unique passcode.

Once the caller identifier is received, a determination is made whether the caller identifier is authentic at an authenticity checking step 710. Determining whether the caller identifier is authentic may be accomplished in a variety of ways. For instance, determining whether the caller identifier is authentic may include checking that an organizer of the conference has associated a received passcode with the conference or that the received passcode otherwise indicates that the caller may participate in the conference. As an example, a received passcode may be checked against a data record containing passcodes allowed for the conference. As another example, a determination may be made whether a caller who has logged into a conferencing system using a username and password is allowed to participate in a conference based on any policies applicable to the caller.

If a determination is made that the caller identifier is authentic, the request to join the conference is accepted or denied according to any policies applicable to the caller. For example, if a timer for a conference has expired, the request to join the conference may be denied. As another example, if a timer for the conference has expired but the caller identifier indicates that a caller is a critical participant, the request to join the conference may be accepted. If a determination is made that the caller identifier is not authentic, the request is denied at request denial step 714. In another embodiment, if a determination is made that the caller identifier is not authentic, instead of denying the request to join the conference, the caller's participation in the conference may be limited, such as in ways described above.

FIG. 8 shows a quorum conferencing method 800 in accordance with an embodiment. In an embodiment, parameters of a quorum are identified for a particular conference. For example, an organizer of a conference may specify, through an interface of a conferencing system, that a conference needs a minimum number of participants to proceed. More complicated parameters are also possible. For example, an organizer for a conference may specify that a conference cannot proceed unless a minimum number of employees of a particular class must be present as well as at least one manager. As another example, the parameters for the quorum may specify that a certain number of people from one department are required while the same number or another number from another department are required. Generally, the parameters can be any set of parameters that allow for the determination of any sets of people for which the conference may or may not proceed.

In an embodiment, when the quorum parameters are identified, a pre-conference is initiated at a pre-conference initiation step. For instance, a pre-conference may be a state of the conference in which people having called in to the conference are communicably connected to a system providing the conferencing capabilities, but such that they are unable to speak among themselves. For example, each person having called in to the conference may simply hear music, silence, or a pre-recorded message during the pre-conference, but not the other callers.

A request to join the conference is received at a request receipt step 806, which may be accomplished in a manner similar to that described above. Other actions, such as authenticating a passcode provided by a caller to the conference may also be performed. In an embodiment, at a quorum checking step 808, a determination is made whether there is a quorum for a particular conference to which the receipt to join has been received. Determining whether there is a quorum for the conference may include, for instance, determining whether callers connected to a conference satisfy the quorum parameters for the conference.

If a determination is made that there is a quorum, then the conference may be begun at a conference initiation step 810 in which the people having called in to the conference are connected and able to communicate with one another. Some time may be allowed to pass before initiating the conference in order to allow subsequent callers additional to that which is required for a quorum to join the conference.

If a determination is made that there is not a quorum, a specified action is taken. The specified action may be a default action or may be an action specified by an organizer of the conference. For example, if a timer for the conference has not expired, a system providing conferencing capabilities may simply wait to see if anymore calls are received before the timer expires or, in an embodiment, if the timer is expired, the pre-conference may be aborted at a pre-conference abortion step 14. In an embodiment, aborting the pre-conference involves providing automated messages to the people who have called in to the conference alerting them that there is no quorum and that the conference will be rescheduled at a later time.

Although specific embodiments of the invention have been described, various modifications, alterations, alternative constructions, and equivalents are also encompassed within the scope of the invention. Modifications, alterations, alternative constructions, equivalents, and various combinations of the methods described above and/or steps of the methods described above may be combined in accordance with various embodiments of the invention. In addition, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of managing a conference, comprising:
communicatively connecting, by a computer system having at least one processor, a set of people to initiate the conference;
setting a timer for managing at least a first level and a second level of participation between a user and the conference, wherein the first level of participation comprises full participation, by the user, in the conference and the second level of participation comprises only providing output of the conference to the user;
receiving a request to join the conference from the user;
communicatively connecting, by the computer system, the user to the conference utilizing the first level of participation if time of the timer is not expired based at least in part upon a set of policies assigned for the user; and
communicatively connecting, by the computer system, the user to the conference utilizing the second level of participation if the time of the timer is expired based at least in art upon the set of policies assigned for the user.

2. The method of claim 1, further comprising:
associating, for the conference, each of a plurality of passcodes with one of a plurality people;
receiving a passcode from the user; and
verifying the passcode against the plurality of passcodes.

3. The method of claim 2, further comprising:
identifying one of said plurality of passcodes as associated with a critical participant;
receiving a second request to join the conference from said second user, said second request including said one of said plurality of passcodes; and
approving the second request regardless of a state of the timer.

4. The method of claim 1, further comprising;
associating each of a plurality of people with one or more groups, said set of people being members of one of said groups;
receiving a second request to join the conference from a second user;
making a determination whether said second user is a member of said one of said groups; and
approving said second request based on said determination.

5. The method of claim 1, further comprising:
identifying attendance parameters for which fulfillment is required for the conference to proceed; and
making a determination that said attendance parameters are fulfilled; and
wherein said communicatively connecting said set of people is performed as a result of said determination.

6. A non-transitory computer-readable medium having stored thereon instructions for causing a computer system to perform a method of managing a conference, said instructions comprising:
instructions for causing the computer system to communicatively connect together a set of people to initiate the conference;
instructions for causing the computer system to set a timer for managing at least a first level and a second level of participation between a user and the conference, wherein the first level of participation comprises full participation, by the user, in the conference and the second level of participation comprises only providing output of the conference to the user;
instructions for causing the computer system to receive a request to join the conference from the user;
instructions for causing the computer to communicatively connect the user to the conference utilizing the first level of participation if time of the timer is not expired based at least in part upon a set of policies assigned for the user; and
instructions for causing the computer to communicatively connect the user to the conference utilizing the second level of participation if time of the timer is expired based at least in part upon a set of policies assigned for the user based at least in part upon the set of policies assigned for the user.

7. The non-transitory computer-readable medium of claim 6, further comprising:
instructions for causing the computer system to associate, for the conference, each of a plurality of passcodes with one of a plurality of people;
instructions for causing the computer system to receive a passcode from the user; and
instructions for causing the computer system to verify the passcode against the plurality of passcodes.

8. The non-transitory computer-readable medium of claim 7, further comprising:
instructions for causing the computer system to identify one of said plurality of passcodes as associated with a critical participant;
instructions for causing the computer system to receive a second request to join the conference from said second user, said second request including said one of said plurality of passcodes; and
instructions for causing the computer system to approve the second request regardless of a state of the timer.

9. The non-transitory computer-readable medium of claim 6, further comprising:
instructions for causing the computer system to associate each of a plurality of people with one or more groups, said set of people being members of one of said groups;
instructions for causing the computer system to receive a second request to join the conference from a second user;
instructions for causing the computer system to make a determination whether said second user is a member of said one of said groups; and
instructions for causing the computer system to approve said second request base on said determination.

10. The non-transitory computer-readable medium of claim 6, further comprising
instructions for causing the computer system to identify attendance parameters for which fulfillment is required for the conference to proceed; and
instructions for causing the computer system to make a determination that said attendance parameters are fulfilled; and
wherein said communicatively connecting said set of people is performed as a result of said determination.

11. A method for managing a teleconference, comprising:
associating a plurality of people with a plurality of identifiers, each person of said people associated with at least one identifier of said identifiers;
setting a timer for managing at least a first level and a second level of participation with the teleconference, wherein the first level of participation comprises full participation with the teleconference and the second level of participation comprises only providing output of the teleconference and
for each caller of a plurality of callers to the teleconference that are associated with different identifiers of said identifiers:
soliciting from the caller authentication information;
receiving from the caller said authentication information in response to said soliciting;
making a first determination based on said authentication information whether said caller is associated with an identifier of said identifiers; and
taking one or more specified actions for the teleconference based on said first determination, wherein the one or more specified actions include:
communicatively connecting, by a computer system having at least one processor, the caller to the teleconference utilizing the first level of participation if time of the timer is not expired based at least in part upon a set of policies assigned for the user; and
communicatively connecting, by the computer system, the caller to the teleconference utilizing the second level of participation if the time of the timer is expired based at least in part upon the set of policies assigned for the user.

12. The method of claim 11, wherein the one or more specified actions further include communicatively connecting the caller to the teleconference.

13. The method of claim 11, further comprising:
identifying a set of said plurality of people as critical participants for the teleconference; and
making a second determination whether said caller is identified as a critical participant for the teleconference; and
wherein the one or more specified actions are further based on said second determination.

14. The method of claim 1 further comprising:
identifying subsets of said plurality of people;
assigning a first subset of said subsets to the teleconference; and making a second determination whether said caller is a member of said first subset: and wherein the one or more specified actions are further based on said second determination and includes communicatively connecting the caller to the teleconference.

15. The method of claim 11, further comprising:

identifying attendance parameters for which fulfillment is required for the teleconference to proceed; and wherein said specified action includes:

making a second determination whether attendance parameters are fulfilled; and initiating said teleconference based on said second determination.

16. A non-transitory computer-readable medium having stored thereon instructions for causing a computer system to perform a method for managing a teleconference, said instructions comprising:

instructions for causing the computer system to associate a plurality of people with a plurality of identifiers, each person of said people associated with at least one identifier of said identifiers;

instructions for causing the computer system to set a timer for managing at least a first level and a second level of participation with the teleconference, wherein the first level of participation comprises full participation with the teleconference and the second level of participation comprises only providing output of the teleconference; and instructions for causing the computer system to, for each caller of a plurality of callers to the teleconference that are associated with different identifiers:

provide a solicitation to the caller for authentication information;

receive from the caller said authentication information in response to said solicitation;

make a first determination based on said authentication information whether said caller is associated with an identifier of said identifiers; and take one or more specified actions for the teleconference based on said first determination, wherein the one or more specified actions include:

communicatively connecting, by a computer system having at least one processor, the caller to the teleconference utilizing the first level of participation if time of the timer is not expired based at least in part upon a set of policies assigned for the user; and communicatively connecting, by the computer system, the caller to the teleconference utilizing the second level of participation if the time of the timer is expired based at least in part upon the set of policies assigned for the user.

17. The non-transitory computer-readable medium of claim 16, wherein the one or more specified actions further include communicatively connecting the caller to the teleconference.

18. The non-transitory computer readable medium of claim 16, further comprising:

instructions for causing the computer system to identify a set of said plurality of people as critical participants for the teleconference; and instructions for causing the computer system to make a second determination whether said caller is identified as a critical participant for the teleconference; and wherein the one or more specified actions are further based on said second determination.

19. The non-transitory computer readable medium of claim 16, further comprising:

instructions for causing the computer system to identify subsets of said plurality of people;

instructions for causing the computer system to assign a first subset of said subsets to the teleconference; and instructions for causing the computer system to make a second determination whether said caller is a member of said first subset; and wherein the one or more specified actions are further base on said second determination and includes communicatively connecting the caller to the teleconference.

20. The non-transitory computer-readable medium of claim 16, further comprising:

instructions for causing the computer system to identify attendance parameters for which fulfillment is required for the teleconference to proceed; and wherein said instructions for causing the computer system to take a specified action includes:

instructions for causing the computer system to make a second determination whether attendance parameters are fulfilled; and instructions for causing the computer system to initiate said teleconference based on said second determination.

21. A system for managing teleconferences, comprising:

a data store operable to store a plurality of identifiers, each identifier associated with at least one person;

a server communicatively coupled to said data store and operable to:

set a tinier for managing at least a first level and a second level of participation with the teleconference, wherein the first level of participation comprises full participation with the teleconference and the second level of participation comprises only providing output of the teleconference; and for each caller of a plurality of callers to he teleconference that are associated with different identifiers of said identifiers:

provide a solicitation to the caller for authentication information;

receive from the caller said authentication information in response to said solicitation;

make a first determination based on said authentication information whether said caller is associated with an identifier of said identifiers; and take one or more specified actions for the teleconference based on said first determination, wherein the one or more specified actions include:

communicatively connecting by a computer having at least one processor, the caller to the teleconference utilizing the first level of participation if time of the timer is not expired based at least in part upon a set of policies assigned for the user; and communicatively connecting, by the computer system, the caller to the teleconference utilizing the second level of participation if the time of the tinier is expired based at least in part upon the set of policies assigned for the user.

22. The system of claim 21, wherein the one or more specified actions further include communicatively connecting the caller to the teleconference.

23. The system of claim 21, wherein the server is further operable to:

identify a set of said plurality of people as critical participants for the teleconference; and make a second determination whether said caller is identified as a critical participant for the teleconference; and wherein the one or more specified actions are further based on said second determination.

24. The system of claim 21, wherein the server is further operable to:
identify subsets of said plurality of people;
assign a first subset of said subsets to the teleconference; and
make a second determination whether said caller is a member of said first subset; and
wherein the one or more specified actions are further based on said second determination and includes communicatively connecting the caller to the teleconference.

25. The system of claim 21, wherein the data store is further operable to store attendance parameters for which fulfillment is required for the teleconference to proceed and wherein the server is further operable to make a second determination whether attendance parameters arc fulfilled initiate said teleconference based on said second determination.

* * * * *

UNITED STATES PATENT AND TRADEMARK OFFICE
CERTIFICATE OF CORRECTION

| | | |
|---|---|---|
| PATENT NO. | : 8,761,364 B2 | |
| APPLICATION NO. | : 12/536406 | |
| DATED | : June 24, 2014 | |
| INVENTOR(S) | : Koul et al. | |

It is certified that error appears in the above-identified patent and that said Letters Patent is hereby corrected as shown below:

In the Drawings

On Sheet 3 of 5, in figure 3, under reference numeral 306, line 2, delete "CONFEENCE" and insert -- CONFERENCE --, therefor.

In the Claims

Column 14, line 54, in Claim 1, delete "art" and insert -- part --, therefor.

Column 14, line 57, in Claim 2, after "plurality" insert -- of --.

Column 16, line 11, in Claim 9, delete "base" and insert -- based --, therefor.

Column 16, line 31, in Claim 11, delete "teleconference and" and insert -- teleconference; and --, therefor.

Column 16, line 64, in Claim 14, delete "claim 1" and insert -- claim 11,--, therefor.

Column 17, line 2, in Claim 14, delete "subset: and" and insert -- subset; and --, therefor.

Column 18, line 8, in Claim 19, delete "base" and insert -- based --, therefor.

Column 18, line 29, in Claim 21, delete "tinier" and insert -- timer --, therefor.

Column 18, line 35, in Claim 21, delete "he" and insert -- the --, therefor.

Column 18, line 48, in Claim 21, delete "connecting" and insert -- connecting, --, therefor.

Signed and Sealed this
Twenty-fourth Day of February, 2015

Michelle K. Lee
*Deputy Director of the United States Patent and Trademark Office*

CERTIFICATE OF CORRECTION (continued)
U.S. Pat. No. 8,761,364 B2

Column 18, line 48, in Claim 21, delete "computer" and insert -- computer system --, therefor.

Column 18, line 57, in Claim 21, delete "tinier" and insert -- timer --, therefor.